US006689852B2

United States Patent
Baugh et al.

(10) Patent No.: US 6,689,852 B2
(45) Date of Patent: Feb. 10, 2004

(54) MODIFIERS FOR IMPROVED OLEFIN POLYMERIZATION WITH ACTIVATED NEUTRAL ALUMINUM COMPOUNDS

(75) Inventors: Lisa Saunders Baugh, Springfield, NJ (US); Joseph Anthony Sissano, Leonardo, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 13 days.

(21) Appl. No.: 10/046,809

(22) Filed: Jan. 15, 2002

(65) Prior Publication Data

US 2003/0144136 A1 Jul. 31, 2003

(51) Int. Cl.$^7$ ............................. C08F 4/52; C08F 4/54
(52) U.S. Cl. ...................... 526/226; 526/185; 526/186; 526/187; 526/129; 526/348; 526/196; 502/152; 502/202
(58) Field of Search ................................ 526/185, 186, 526/196, 129, 348, 187, 226; 502/152, 202

(56) References Cited

U.S. PATENT DOCUMENTS

| | | | |
|---|---|---|---|
| 2,695,327 A | 11/1954 | Ziegler et al. ......... | 260/683.15 |
| 2,699,457 A | 1/1955 | Ziegler et al. ......... | 260/683.15 |
| 3,257,332 A | 6/1966 | Ziegler et al. ........... | 252/429 |
| 5,326,838 A * | 7/1994 | Ruiz Santa Quiteria et al. ............. | 526/187 |
| 5,561,095 A * | 10/1996 | Chen et al. .................. | 502/169 |
| 5,777,120 A | 7/1998 | Jordan et al. ................... | 546/2 |
| 5,912,202 A | 6/1999 | Oskam et al. .............. | 502/104 |
| 6,232,257 B1 | 5/2001 | Sen et al. .................. | 502/114 |
| 6,291,387 B1 | 9/2001 | Sen et al. .................. | 502/152 |
| 2001/0031844 A1 * | 10/2001 | Sen et al. .................... | 526/196 |

FOREIGN PATENT DOCUMENTS

| | | | |
|---|---|---|---|
| CA | 914849 | 11/1972 | .................. 402/632 |
| WO | WO 9727224 | 7/1997 | ........... C08F/4/651 |

OTHER PUBLICATIONS

Yoshinori Seki, et al., "Highly Active Aluminum–based Catalyst System for Olefin Polymerizaion", Polymeric Materials: Science & Engineering 2003, 88, 537–538.

U.S. Patent Application Publication No.: US2001/0031844 A1, Pub. Date: Oct. 18, 2001, Filed Feb. 7, 2001.

Jang Sub Kim, et al., "Novel Aluminum–Based, Transition Metal–Free, Catalytic Systems for Homo and Copolymerization of Alkenes," Polymer Preprints, 2000, 41(2), 1891.

Jang Sub Kim, et al., "Novel Aluminum–Based, Transition Metal–Free, Catalytic Systems for Homo– and Copolymerization of Alkenes," J. Am. Chem. Soc. 2000, 122, 5668–5669.

Heinz Martin, et al., "High–molecular–weight polyethylene: growth reactions at bis(dischloroaluminium)ethane and tri-alkylaluminium," Makromol. Chem. 193, 1283–1288 (1992).

Louis M. Wojcinski II, et al., "The Polymerization of Ethylene and Higher Olefins Using Transition Metal–Free Aluminum Based Catalyst Systems," Polymer Preprints, 1998, 39(2), pp. 510.

R. F. Jordan, et al., "Cationic Aluminum Aklyl Complexes. Transition–Metal–Free Olefin Polymerization Catalysts," Dept. of Chemistry, University of Iowa, Polym. Mat. Sci. Eng. 1999, 80, 418–419.

M. P. Coles, et al., "Cationic Aluminum Alkyl Complexes Incorporation Amidinate Ligands. Transition–Metal–Free Ethylene Polymerization Catalysts.", Dept of Chemistry, University of Iowa, J. Am. Chem. Soc. 1997, 1999, 8125–8126.

Eiji Ihara, et al., "Cationic Aluminum Alkyl Complexes Incorporation Aminotroponiminate Ligands," Dept of Chemistry, University of Iowa, Dept of Chemistry, University of Minnesota, J. Am. Chem. Soc. 1998, 120, 8277–8278.

Michael Bruce, et al., "Cationic Alkyl Aluminum Ethylene Polymerization Catalysts Based on Monoanionic N,N, N–Pyridyliminoamide Ligands," Dept of Chemistry, Imperial College, Chem. Commun. 1998, 2523–2524.

Paul A. Cameron, et al., "Pendant Arm Schiff Base Complexes of Aluminum as Ethylene Polymerization Catalysts," Dept of Chemistry, Imperial College, Chem. Commun. 1999, 1883–1884.

* cited by examiner

Primary Examiner—Roberto Rabago
(74) Attorney, Agent, or Firm—Joseph C. Wang

(57) ABSTRACT

The present invention is for a transition metal-free catalyst system for synthesizing high molecular weight, linear polymers. The system comprises a catalyst composition having: (a) a neutral compound having the formula $AlR_3$, wherein R is an alkyl or hydride group; (b) a Lewis acid or Lewis acid derivative cocatalyst different from the neutral compound, wherein the cocatalyst reacts with the neutral compound to form an initiator; and (c) an activity-enhancing modifier, wherein the modifier reacts with the initiator to form the catalyst composition. The instant invention is also directed to a method for polymerizing at least one olefinic monomer comprising the step of contacting a feed containing the olefinic monomer under polymerization conditions with the transition metal-free catalyst composition.

32 Claims, No Drawings

MODIFIERS FOR IMPROVED OLEFIN POLYMERIZATION WITH ACTIVATED NEUTRAL ALUMINUM COMPOUNDS

BACKGROUND OF THE INVENTION

1. Field of the Invention

The present invention relates to polymerization of olefinic monomers. In particular, the instant invention provides a novel catalyst system that incorporates a modifier to improve polymerization results. Additionally, the present invention relates to a novel polymerization process that utilizes the novel catalyst system.

2. Description of the Related Art

The current "state of the art" catalysts for the synthesis of polyolefins are metallocenes. These initiators consist of a Group IV or similar metal dihalide or dialkyl ligated by two cyclopentadienyl fragments or equivalents, and a Lewis Acid activator or cocatalyst, typically methylaluminoxane or a borane, which converts the Group IV complex to its cationic form. Metallocenes are versatile initiators because chemical modification of their cyclopentadienyl (or equivalent) ligands may be carried out in order to tailor catalyst activity and polymer properties. Metallocenes are also extremely efficient initiators, producing one ton or more of polyethylene (PE) per gram of initiator in some extreme cases. However, they are relatively expensive, and preparation of the cyclopentadienyl-type ligands and catalysts may require complicated synthetic procedures. For these reasons, polyolefin catalysts composed of simpler and cheaper organometallics are greatly desired.

Recent research has revealed that catalysts based on main group (Group 13) metals, rather than transition metals, may be used for the synthesis of polyolefins. Jordan (*Polym. Mat. Sci. Eng.*, 1999, 80, 418–419; *J. Am. Chem. Soc.*, 1997, 119, 8125–8126; *J. Am. Chem. Soc.*, 1998, 120, 8277–8278; U.S. Pat. No. 5,777,120) and Gibson (*Chem. Commun.*, 1998, 2523–2524; *Chem. Commun.*, 1999, 1883–1884) have both reported catalysts for the preparation of linear polyethylene based on borane-activated, cationic $LAlR^+$ species (where L=a ligand; Al=aluminum; and R=an alkyl or hydride group). These catalysts possess only low activities and require complex, chelating N,N'- or N,N',N"-spectator ligands to protect the cation from deactivating side reactions. In 1992, Martin (*Makromol. Chem.*, 1992, 193, 1283–1288) reported the preparation of high-molecular weight polyethylene using simple neutral $R_3Al$ or $(Cl_2Al)_2Et$ compounds as initiators. In 1998, Sen (*Polym. Prepr., Am. Chem. Soc. Div. Polym. Chem.*, 1998, 39(2), 510; *J. Am. Chem. Soc.*, 2000, 122, 5668–5669; U.S. Pat. No. 6,291,387) developed an improved methodology involving neutral alkylaluminum catalysts that are activated for polymerization, but not rendered cationic, by the addition of a borane or methylaluminoxane (MAO) in the highly polar, noncoordinating solvent chlorobenzene. Under conditions of 50° C. and 800 psi ethylene, linear polyethylene ($T_m$=138–140° C.) is obtained. The molecular weights of the resultant polymers may exceed 200,000 and polymerization activities can reach 13.75 kg PE/mol cat•h, the highest values achieved of any of the aluminum-based systems discussed above. Propylene may also be homo- or co-polymerized.

Ethylene polymerization catalysts composed of simpler and cheaper organometallics as compared to metallocenes are continually sought by manufacturers of polyolefins. Recent reports of non-transition-metal-containing polymerization initiators based on aluminum, specifically "activated neutral" rather than cationic aluminum, are attractive for these reasons. See U.S. Pat. No. 6,291,387 to Sen, et al. But these initiators possess much lower polymerization activities than metallocenes. For these initiators to be considered as potential economically attractive replacements to metallocenes, their activities must be improved.

Electron-donating olefins have been used in PCT Patent No. WO 97/27224 as catalyst modifiers for ethylene/1-hexene and propylene polymerizations carried out with solid-supported metallocenes/MAO. Moderate improvements in activity and 1-hexene comonomer incorporation were observed. U.S. Pat. No. 5,912,202 to Oskam, et al., discloses the addition of 1-hexene to single site Group IV catalyst precursors to improve ethylene/1-hexene copolymerization activities. In Canadian Patent No. CA 914,849 to Wristers, alpha-monoolefins were utilized to improve the efficiency of Ziegler-Natta catalysts systems; however, the use of cyclopentene and other more highly substituted olefins was not effective. No work has been carried out involving the use of additives or modifiers for main-group-mediated, transition metal-free olefin polymerizations.

SUMMARY OF THE INVENTION

The instant invention describes the use of activity-enhancing modifiers in a transition metal-free catalyst system for the improved polymerization of olefinic monomers. The modifiers react with an $AlR_3$ compound, wherein Al is aluminum and R is an alkyl or hydride group, and a Lewis acid or Lewis acid derivative cocatalyst. The modifiers are internal, cyclic, or terminal olefins. The most preferred modifiers are cyclopentene, cyclohexene, norbornene, cis-stilbene, trans-stilbene, cis-2-hexene, trans-2-hexene, cis-3-hexene, trans-3-hexene, styrene, and 1-hexene.

The catalyst system can be either supported or not supported. When supported, the catalyst system preferably is a silica supported system.

The present invention is also directed to a method for polymerizing olefinic monomers using the novel transition metal-free catalyst system comprising an $AlR_3$ compound, a Lewis acid or Lewis acid derivative cocatalyst, and an activity-enhancing modifier.

The preferred olefinic monomers are ethylene, propylene, and an ethylene-propylene combination.

The polymerization method may be conducted in a solvent. The preferred solvent is a polar solvent, most preferably chlorobenzene.

DETAILED DESCRIPTION OF THE INVENTION

The present invention is for an activity-enhancing modifier used in a transition metal-free catalyst system for the improved synthesis of high molecular weight, linear polymers of olefins. A feed containing at least one olefinic monomer is contacted with a transition metal-free catalyst composition having the modifier and an initiator. The initiator is the reaction product of a neutral compound having the formula $AlR_3$, wherein Al is aluminum and R is an alkyl or hydride group, and a Lewis acid or Lewis acid derivative cocatalyst that is different from the $AlR_3$ compound. The preferred R group in $AlR_3$ is an ethyl group.

Preferred olefinic monomers are ethylene, propylene, and a mixture of ethylene and propylene. Other olefinic monomers may be used in the polymerization process.

The preferred cocatalysts are boranes and borate salts. The most preferred cocatalysts are $B(C_6F_5)_3$, $[Ph_3C]^+[B(C_6F_5)_4]^-$ and $[Me_2PhNH]^+[B(C_6F_5)_4]^-$.

The modifier is preferably an internal, cyclic, or terminal olefin. The preferred internal olefin modifiers are cis-stilbene, trans-stilbene, cis-2-hexene, trans-2-hexene, cis-3-hexene, trans-3-hexene, and derivatives thereof. The preferred cyclic olefin modifiers are cyclopentene, cyclohexene, norbornene, and derivatives thereof. And the preferred terminal olefin modifiers are styrene, 1-hexene, and derivatives thereof.

Based on the data given in the Examples and Tables to follow, the relative effectiveness of the various olefins used as modifiers can be roughly compared. Cyclopentene appears to have the greatest effect, as quantified by yield enhancement, magnitude and rapidity of observed polymerization exotherm, magnitude and rapidity of ethylene uptake, and molar amount required for the greatest positive changes in these parameters. Trans-3-hexene, trans-stilbene, styrene, norbornene, and cyclohexene show positive, although smaller effects when present at 0.5–1.0 equivalents per aluminum center. For 1-hexene, the largest enhancements of activity are observed in the range of 1.0–10 equivalents per aluminum center. Thus, variations in the substitution pattern, sterics, electronics, accessibility (conformation of substituents), and amount of $sp^3$ bond character (ring strain) of the modifier's olefin group influence the properties of the modifier within the catalyst composition.

One potential manner in which the modifier can act upon the initiator to influence polymerization activity is through a very weak (even weaker than ethylene) $\pi$-coordination to the "activated neutral" aluminum center of the initiator. In this manner, it may conceivably act as a stabilizing influence on the active polymerization center, while remaining easily displaceable by ethylene monomer. $^1H$ NMR experiments in d-chlorobenzene studying $Et_3Al/B(C_6F_5)_3$ with one or two added equivalents of cyclopentene do not reveal monomer coordination or noticeable changes in initiator structure. However, when $\sigma$-donor Lewis bases, such as ethyl acetate, tetrahydrofuran, and 5-hexen-2-one, are used as the modifier component, ethylene polymerization is suppressed. Hence, the internal, cyclic, and terminal olefinic modifiers of the instant invention likely function in an opposing manner to enhance polymerization.

In a preferred embodiment, the ratio of the molar equivalent of the modifier to the molar equivalent of the aluminum in the $AlR_3$ neutral compound (i.e., the aluminum center) is from 0.01–250 to 1, respectively. It is more preferred that this ratio is from 0.2–20 to 1, respectively. It is most preferred that the ratio is from 0.33–10 to 1, respectively.

The extremely small amounts of modifier needed to cause noticeable improvements in activity for ethylene polymerization indicate that the olefinic modifiers are functioning as a critical part of the catalyst system through molecular interactions with the initiator. Although some of the olefinic modifiers are capable of being polymerized themselves under other circumstances, their role in the present invention is very different than that of a comonomer. To function as comonomers for the polymerization of ethylene, a much higher concentration (large molar excess as compared to initiator) would be required. Thus, this is a novel aspect of the present invention that was heretofore unknown in the art.

The novel catalyst system disclosed herein may be supported, as is known in the art. The preferred supported system is a silica supported catalyst system.

The step of contacting the feed containing the olefinic monomer with the novel transition metal-free catalyst system is performed under polymerization conditions. Such conditions are typically at a temperature range of from about 0° C. to about 100° C. and at a pressure range of from about 400 psig to about 1,000 psig.

In another preferred embodiment, the contacting step may also be conducted in a solvent. The preferred solvent is a polar solvent, the most preferred of which is chlorobenzene.

The contacting step may be performed in a gas phase, as is known in the art.

The novel catalyst system of the instant invention advantageously utilizes the modifier to obtain better polymerization results than previously shown in the art. Catalyst activity is increased as evidenced by higher yields, quicker initial and/or larger ultimate ethylene uptakes (as measured by decreases in reactor pressure over time) and larger polymerization exotherms. Since ethylene polymerization yields known in the art were found to be extremely sensitive to scale and laboratory conditions (reactor history, reagent quality and source), the present invention may be very useful under conditions where impurities are present in the polymerization system. Additionally, improvement of catalyst performance through the addition of a small amount of a modifier is an important achievement towards rendering aluminum-based polymerization systems more competitive with metallocene initiators.

The examples below will reveal these and other advantages of the present invention.

EXAMPLES

Example 1

Enhanced Polymerization of Ethylene with $Et_3Al/B(C_6F_5)_3$ Using Cyclopentene as a Modifier.

An oven-dried 300 mL Hasteloy C Parr reactor, stirring shaft and blade, and glass liner were taken into the drybox. Triethylaluminum (Aldrich, neat, 200 mg, 1.75 mmol) was weighed into a vial and diluted with about 20 mL chlorobenzene (distilled from $CaH_2$). Tris(pentafluorophenyl)borane (Strem, 897 mg, 1.75 mol) was weighed into the glass liner and dissolved in 40 mL chlorobenzene. Subsequently, the alkylaluminum solution was transferred to the glass liner and diluted with an additional 15 mL chlorobenzene. The liner was placed into the Parr reactor bottom. The reactor was quickly assembled, sealed, and removed from the glove box, and heated to 50° C. on an ethylene manifold while the contents were stirred at ca. 350 rpm with an air-driven stirring shaft. After a quick nitrogen purge of connected lines, the reactor was briefly pressurized to 200 psi with ethylene (BOC, passed through drying columns of molecular sieves and Q5 catalyst) and vented, after which cyclopentene (distilled from $CaH_2$, 1 mL, 0.774 g, 11.4 mmol) was added via syringe. The reactor was pressurized with a single 800 psi charge of ethylene for 10 seconds, sealed off from all gas lines and stirred at 50° C. overnight, after which a pressure drop of −640 psi had taken place. The reactor was cooled to room temperature, vented, and opened, and 5 mL of 5% HCl in methanol was then added to quench the polymerization. A solid white mass was found surrounding the stirring shaft and thermocouple inside the reactor. The liquid contents of the reactor were poured into ca. 1 L of 5% HCl in methanol. The particles of white insoluble polymer present were collected by filtration, rinsed with a small volume of additional methanol, and dried in a vacuum oven overnight at 75° C. The solid polymer present on the reactor surfaces was carefully removed with a razor blade and chopped into coin-sized pieces, after which it was placed in a Waring blender along with 500 mL methanol. After being ground to a fine particle size, it was treated with an excess of acidified methanol as described above, rinsed with clean methanol, isolated, combined with the polymer isolated from the liquid reactor contents, and dried as described above (18.11 g total yield). DSC: $T_m$ (2nd heat)=135° C., 120.3 mJ/mg. GPC (1,2,4-trichlorobenzene, 135° C., vs. polyethylene, light scattering, 32% calculated dissolution): $M_n$=311,000; $M_w/M_n$=1.88. $^{13}C\{^1H\}$ NMR ($d_2$-tetrachloroethane): δ 29.5 (s); no evidence of cyclopentene incorporation or branching seen. IR (KBr): 2930 (sh), 2700 (vs), 2657 (vs), 2661 (sh), 1464 (s), 1368 (w), 1306 (w), 719 (m) cm$^{-1}$. Data is presented in Table 1.

Examples 2–5

Additional Ethylene Polymerizations Using Varying Amounts of Cyclopentene as a Modifier, and Comparative Example Examples 2–5 were carried out identically to Example 1 with the exception that for Example 2, the cyclopentene was diluted in the drybox with 5 mL chlorobenzene and added to the reactor as a solution via syringe. Example 5 is a comparative example run in the absence of cyclopentene. Data is presented in Table 1 showing the higher yields and larger/quicker ultimate ethylene uptakes observed in the presence of small amounts of cyclopentene modifier as compared to the control example.

Example 6

Ethylene Polymerization Using Neat Cyclopentene as a Solvent/Modifier

Example 6 was carried out identically to Example 1 except that no chlorobenzene solvent was used. In the drybox, the tris(pentafluorophenyl)borane cocatalyst was dissolved directly in 40 mL cyclopentene in the glass reactor liner. The triethylaluminum was added and the reactor sealed and manipulated as described in Example 1. Data is presented in Table 1.

TABLE 1

Enhanced polymerization of ethylene with $Et_3Al/B(C_6F_5)_3$ using cyclopentene as a modifier (Examples 1–6).

| Ex. No. | Equiv. cyclopentene per Al | Initial/final Δ P drops (psi); time elapsed (h) | Exotherm, time elapsed (h) | Yield Polyethylene (g) | Notes |
|---|---|---|---|---|---|
| 2 | 0.34 | −200 (0:16)<br>−760 (5:30) | +56° C. (0:15) | 24.4 | Run time 5:30 h |
| 3 | 0.65 | −200 (0:25)<br>−780 (2:00)<br>−800 (ov) | +47° C. (1:20) | 28.9 | |
| 4 | 3.26 | N/R<br>−640 (1:30)<br>−720 (ov) | N/R | 24.1 | |
| 1 | 6.5 | N/R<br>−640 (ov) | N/R | 18.11 | |
| 6 | 259 | not large | N/R | 2.48 | Neat, in 40 mL cyclopentene |
| 5 | 0 | N/R<br>−640 (ov) | N/R | 12.6 | Comparative example |

Conditions as given in Example 1: 1.75 mmol $Et_3Al/B(C_6F_5)_3$, 75 mL chlorobenzene, 50° C., single charge of 800 psi $C_2H_4$, overnight (ov). N/R = not recorded; h = hour. "Initial" pressure drops are quantified by the time required for a −200 psi uptake.

Example 7

Reproducibility of Enhanced Ethylene Polymerization Results Using Cyclopentene as a Modifier Example 7 was carried out identically to Example 1. An ultimate pressure drop of −660 psi was seen overnight, and a yield of 19.3 g polyethylene was obtained.

Example 8

Reproducibility Using a Variation of Cyclopentene Addition Procedure

Example 8 was carried out identically to Example 1 except that the cyclopentene was added to the glass liner containing the Et₃Al/B(C₆F₅)₃ in the drybox, prior to sealing and charging the reactor. An ultimate pressure drop of −640 psi was seen overnight, and a yield of 17.9 g polyethylene was obtained.

Example 9

Robustness of Et₃Al/B(C₆F₅)₃ Catalyst System for Ethylene Polymerization Using Cyclopentene as a Modifier Example 9 was carried out identically to Example 2 using 0.32 mmol Et₃Al/B(C₆F₅)₃. An exotherm of +42° C. was observed after 30 minutes and a pressure drop of −600 psi was seen after 3 hours 20 minutes. At that point a second charge of 800 psi ethylene was added to the reactor. An initial pressure drop of −200 psi was seen at 32 minutes after the second charge, and an ultimate pressure drop of −520 psi was seen overnight. A yield of 33.6 g polyethylene was obtained.

Examples 1–9 and Table 1 give ethylene polymerization data for the Et₃Al/B(C₆F₅)₃ initiator, with the cyclopentene modifier added in various amounts. A comparison with the prior art (absence of cyclopentene) is also shown. Yield enhancements are seen when cyclopentene is added in amounts of 0.34 to 6.5 equivalents per aluminum center, with the maximum enhancement occurring at slightly below 1 equivalent of cyclopentene. In contrast, the use of large excesses of cyclopentene (i.e. Example 6) had an inhibiting effect. The largest yield enhancements are accompanied by the most rapid pressure drops, and by polymerization exotherms of up to +56° C. In one case (Example 9), it was demonstrated that it is possible to add a second charge of ethylene after monomer depletion; the catalyst still remained active as evidenced by a further large pressure drop and increase in yield.

Example 10

Enhanced Polymerization of Ethylene with Et₃Al/B(C₆F₅)₃ Using Trans-3-hexene as a Modifier Example 10 was carried out identically to Example 1 using 1.0 equivalent (147 mg) of trans-3-hexene (distilled from CaH₂) as the modifier. The trans-3-hexene was diluted in the drybox with 3 mL chlorobenzene and added to the reactor as a solution via syringe. A yield of 25.3 g polyethylene was obtained. DSC: $T_m$ (2nd heat)=135.0° C., 165.6 mJ/mg. GPC (1,2,4-trichlorobenzene, 135° C., vs. polyethylene, light scattering): $M_n$=128,300; $M_w/M_n$=1.95. ¹³C{¹H} NMR (d₂-tetrachloroethane): δ 29.98 (s); highly linear (branching not quantified). Data is presented in Table 2.

Examples 11–13

Additional Ethylene Polymerizations Using Varying Amounts of Trans-3-hexene as a Modifier, and Comparative Example Examples 11–13 were carried out identically to Example 10. Example 13 is a comparative example run in the absence of trans-3-hexene immediately prior to Example 10. Data is presented in Table 2 showing the higher yields, quicker initial and larger ultimate pressure drops, and larger/quicker exotherms observed in the presence of small amounts of trans-3-hexene modifier as compared to the control example.

TABLE 2

Enhanced polymerization of ethylene with Et₃Al/B(C₆F₅)₃ using trans-3-hexene as a modifier (Examples 10–13).

| Ex. No. | Equiv. trans-3-hexene per Al | Initial/final Δ P drops (psi); time elapsed (h) | Exotherm; time elapsed (h) | Yield Polyethylene (g) | Notes |
|---|---|---|---|---|---|
| 11 | 0.5 | −200 (0:15) −780 (10:35) −800 (ov) | +46° C. (0:18) | 21.86 | |
| 10 | 1.0 | −200 (0:15) −780 (8:35) −800 (ov) | +46° C. (0:13) | 25.32 | |
| 12 | 10 | −200 (0:32) −730 (11:00) | +1° C. (4:13) | 22.17 | Run time 11:00 h |
| 13 | 0 | −200 (0:20) −760 (7:20) −800 (ov) | +29° C. (0:35) | 21.5 | Comparative example |

Conditions as given in Example 1: 1.75 mmol Et₃Al/B(C₆F₅)₃, 75 mL chlorobenzene, 50° C., single charge of 800 psi C₂H₄, overnight (ov). "Initial" pressure drops are quantified by the time required for a −200 psi uptake.

Example 14

Enhanced Polymerization of Ethylene with Et₃Al/B(C₆F₅)₃ Using Norbornene as a Modifier Example 14 was carried out identically to Example 1 using 1.0 equivalent (165.2 mg) of norbornene (degassed under high vacuum prior to use) as the modifier. The solid norbornene was dissolved in approximately 5 mL chlorobenzene and added to the reactor as a solution via syringe. A yield of 25.1 g polyethylene was obtained. Data is presented in Table 3.

Examples 15–17

Additional Ethylene Polymerizations Using Varying Amounts of Norbornene as a Modifier, and Comparative Example Examples 15–17 were carried out identically to Example 14. Example 17 a comparative example run in the absence of norbornene immediately prior to Example 14. The polyethylene obtained from Example 15 had the following characteristics: DSC: $T_m$ (2nd heat)=134.9° C., 147.5 mJ/mg. GPC (1,2,4-trichlorobenzene, 135° C., vs. polyethylene, light scattering): $M_n$=124,800; $M_w/M_n$=1.99. $^{13}C\{^1H\}$ NMR ($d_2$-tetrachloroethane): δ 29.98 (s); highly linear (branching not quantified). Data is presented in Table 3 showing the higher yields, quicker initial and larger ultimate pressure drops, and larger and/or quicker exotherms observed in the presence of small amounts of norbornene modifier as compared to the control example.

TABLE 3

Enhanced polymerization of ethylene with $Et_3Al/B(C_6F_5)_3$ using norbornene as a modifier (Examples 14–17).

| Ex. No. | Equiv. norbornene per Al | Initial/final Δ P drops (psi); time elapsed (h) | Exotherm; time elapsed (h) | Yield Polyethylene (g) | Notes |
|---|---|---|---|---|---|
| 15 | 0.5 | −200 (0:13) −800 (9:00) | 52° C. (0:14) | 23.4 | |
| 14 | 1.0 | −200 (0:19) −720 (6:20) −780 (ov) | +42° C. (0:19) | 25.1 | |
| 16 | 10 | −200 (0:24) −720 (9:00) −800 (ov) | +9° C. (0:35) | 23.8 | Yellow tinge to polymer |
| 17 | 0 | −200 (0:20) −700 (8:40) −740 (ov) | +54° C. (0:17) | 23.5 | Comparative example |

Conditions as given in Example 1: 1.75 mmol $Et_3Al/B(C_6F_5)_3$, 75 mL chlorobenzene, 50° C., single charge of 800 psi $C_2H_4$, overnight (ov). "Initial" pressure drops are quantified by the time required for a −200 psi uptake.

Example 18

Enhanced Polymerization of Ethylene with $Et_3Al/B(C_6F_5)_3$ Using Cyclohexene as a Modifier Example 18 was carried out identically to Example 1 using 1.0 equivalent (143 mg) of cyclohexene (distilled from $CaH_2$) as the modifier. The cyclohexene was diluted in the drybox with 3 mL chlorobenzene and added to the reactor as a solution via syringe. A yield of 19.9 g polyethylene was obtained. Data is presented in Table 4.

Examples 19–21

Additional Ethylene Polymerizations Using Varying Amounts of Cyclohexene as a Modifier, and Comparative Example Examples 19–21 were carried out identically to Example 18. Example 21 is a comparative example run in the absence of cyclohexene immediately prior to Example 18. The polyethylene obtained in Example 19 had the following characteristics: DSC: $T_m$ (2nd heat) 128.5° C., 149.9 mJ/mg. GPC (1,2,4-trichlorobenzene, 135° C., vs. polyethylene, light scattering): $M_n$=94,500; $M_w/M_n$=2.35. $^{13}C\{^1H\}$ NMR ($d_2$-tetrachloroethane): δ 29.98 (s); highly linear (branching not quantified). Data is presented in Table 4 showing the higher yields observed in the presence of small amounts of cyclohexene modifier as compared to the control example.

TABLE 4

Enhanced polymerization of ethylene with $Et_3Al/B(C_6F_5)_3$ using cyclohexene as a modifier (Examples 18–21).

| Ex. No. | Equiv. Cyclohexene per Al | Initial/final Δ P drops (psi); time elapsed (h) | Exotherm; time elapsed (h) | Yield Polyethylene (g) | Notes |
|---|---|---|---|---|---|
| 19 | 0.5 | −200 (0:10) −760 (11:00) −800 (ov) | +40° C. (0:16) | 22.4 | |
| 18 | 1.0 | N/R | N/R | 19.9 | |
| 20 | 10 | −200 (0:26) −800 (9:05) | +40° C. (1:00) | 24.8 | |
| 21 | 0 | N/R | N/R | 19.7 | Comparative example |

Conditions as given in Example 1: 1.75 mmol $Et_3Al/B(C_6F_5)_3$, 75 mL chlorobenzene, 50° C., single charge of 800 psi $C_2H_4$, overnight (ov). "Initial" pressure drops are quantified by the time required for a −200 psi uptake.

Example 22

Enhanced Polymerization of Ethylene with Et₃Al/B(C₆F₅)₃ Using 1-Hexene as a Modifier Example 22 was carried out identically to Example 1 using 1.0 equivalent (147 mg) of 1-hexene (distilled from CaH$_2$) as the modifier. The 1-hexene was diluted in the drybox with 3 mL chlorobenzene and added to the reactor as a solution via syringe. A yield of 20.1 g polyethylene was obtained. Data is presented in Table 5.

Examples 23–25

Additional Ethylene Polymerizations Using Varying Amounts of 1-Hexene as a Modifier, and Comparative Example Examples 23–25 were carried out identically to Example 22. Example 25 is a comparative example run in the absence of 1-hexene prior to Example 22. The polyethylene obtained from Example 24 had the following characteristics: DSC: $T_m$ (2nd heat)=137.8° C., 140.1 mJ/mg. GPC (1,2,4-trichlorobenzene, 135° C., vs. polyethylene, light scattering): $M_n$=89,300; $M_w/M_n$=2.54. $^{13}C\{^1H\}$ NMR (d$_2$-tetrachloroethane): δ 29.97 (s); highly linear (branching not quantified). Data is presented in Table 5 showing the higher yields, larger and/or quicker exotherms, and larger/quicker ultimate pressure drops observed in the presence of small amounts of 1-hexene modifier as compared to the control example.

Example 26

Enhanced Polymerization of Ethylene with Et₃Al/B(C₆F₅)₃ Using Styrene as a Modifier Example 26 was carried out identically to Example 1 using 1.0 equivalent (183 mg) of styrene (distilled from CaH$_2$) as the modifier. The styrene was diluted in the drybox with 3 mL chlorobenzene and added to the reactor as a solution via syringe. A yield of 25.9 g yield polyethylene with a reddish tinge was obtained. DSC: $T_m$ (2nd heat)= 135.7° C., 149.2 mJ/mg. GPC (1,2,4-trichlorobenzene, 135° C., vs. polyethylene, light scattering): $M_n$=144,600; $M_w/M_n$=2.00. $^1$H NMR (o-dichlorobenzene-d$_4$, 135° C.): δ 1.53 (s); linear (branching not quantified), no evidence of styrene incorporation. Data is presented in Table 6.

Examples 27–28

Additional Ethylene Polymerization Using a Varying Amount of Styrene as a Modifier, and Comparative Example Examples 27–28 were carried out identically to Example 26. Example 28 is a comparative example run in the absence of styrene immediately prior to Example 27. The polyethylene obtained in Example 27 had a reddish tinge and exhibited a $T_m$ (2nd heat) of 127.1° C., 113.2 mJ/mg. Data is presented in Table 6 showing the higher yields, larger and quicker exotherms, and quicker initial and larger and/or quicker ultimate pressure drops observed in the presence of small amounts of styrene modifier as compared to the control example.

TABLE 5

Enhanced polymerization of ethylene with Et₃Al/B(C₆F₅)₃ using 1-hexene as a modifier (Examples 22–25).

| Ex. No. | Equiv. 1-hexene per Al | Initial/final Δ P drops (psi); time elapsed (h) | Exotherm; time elapsed (h) | Yield Polyethylene (g) | Notes |
|---|---|---|---|---|---|
| 23 | 0.5 | −200 (0:10) −800 (9:30) | +33° C. (0:20) | 22.5 | Run time 9:30 h |
| 22 | 1.0 | −200 (0:16) −720 (5:35) −730 (ov) | +41° C (0:14) | 20.1 | |
| 24 | 10 | −200 (0:03) −780 (9:45) −790 (ov) | +50° C. (0:23) | 17.5 | |
| 25 | 0 | −200 (0:08) −680 (9:45) −760 (ov) | +15° C. (0:17) | 17.8 | Comparative example |

Conditions as given in Example 1: 1.75 mmol Et₃Al/B(C₆F₅)₃, 75 mL chlorobenzene, 50° C., single charge of 800 psi C₂H₄, overnight (ov). "Initial" pressure drops are quantified by the time required for a −200 psi uptake.

TABLE 6

Enhanced polymerization of ethylene with Et₃Al/B(C₆F₅)₃ using styrene as a modifier (Examples 26–28).

| Ex. No. | Equiv. styrene per Al | Initial/final Δ P drops (psi); time elapsed (h) | Exotherm; time elapsed (h) | Yield Polyethylene (g) | Notes |
|---|---|---|---|---|---|
| 27 | 0.5 | −200 (0:48) −710 (5:30) −800 (ov) | +24° C. (0:53) | 20.31 | |

TABLE 6-continued

Enhanced polymerization of ethylene with $Et_3Al/B(C_6F_5)_3$ using styrene as a modifier (Examples 26–28).

| Ex. No. | Equiv. styrene per Al | Initial/final Δ P drops (psi); time elapsed (h) | Exotherm; time elapsed (h) | Yield Polyethylene (g) | Notes |
|---|---|---|---|---|---|
| 26 | 1.0 | −200 (0:32) −680 (2:15) −800 (ov) | +30° C. (0:49) | 25.9 | |
| 28 | 0 | −200 (0:48) −640 (5:45) −800 (ov) | +7° C. (1:03) | 19.5 | Comparative example |

Conditions as given in Example 1: 1.75 mmol $Et_3Al/B(C_6F_5)_3$, 75 mL chlorobenzene, 50° C., single charge of 800 psi $C_2H_4$, overnight (ov). "Initial" pressure drops are quantified by the time required for a −200 psi uptake.

Example 29

Enhanced Polymerization of Ethylene with $Et_3Al/B(C_6F_5)_3$ Using Trans-Stilbene as a Modifier Example 29 was carried out identically to Example 1 using 1.0 equivalent (314.4 mg) of trans-stilbene (recrystallized from dry toluene and stored in the dark) as the modifier. The solid trans-stilbene was dissolved in 3 mL chlorobenzene in a dark drybox and added to the reactor as a solution via syringe. An exotherm of +26° C. (0:31 h) was seen, and an initial pressure drop of −200 psi (6 min.) and ultimate pressure drops of −760 (5 hrs.) and −800 (overnight) were observed. A 20.2 g yield of polyethylene with a brownish tinge was obtained. DSC: $T_m$ (2nd heat)= 131.4° C., 136.3 mJ/mg. GPC (1,2,4-trichlorobenzene, 135° C., vs. polyethylene, light scattering): $M_n$=125,500; $M_w/M_n$=2.08. $^1$H NMR (o-dichlorobenzene-$d_4$, 135° C.): δ 1.53 (s); linear (branching not quantified), no evidence of trans-stilbene incorporation. The yield, temperature, and pressure data show the higher yield, larger and quicker exotherm, and quicker initial pressure drop observed in the presence of 1.0 equivalent trans-stilbene modifier as compared to a recently-run control (Example 28).

Examples 10–29 and Tables 2–5 demonstrate the use of other olefins as activity-enhancing modifiers for aluminum-based olefin polymerization. Since these experiments were run with a single charge of ethylene under conditions of eventual 100% monomer consumption, differences in yield between experiments were sometimes not illustrative. The activity-enhancing effects of the modifiers can be more easily observed by the initial and overall rates of ethylene uptake (as measured by the time to a −200 psi pressure drop and time to near/total quantitative pressure drop), and the magnitude and time of the polymerization exotherm. Polymerizations carried out with 0.5–1.0 equivalents of trans-3-hexene, norbornene, cyclohexene, styrene or trans-stilbene or 0.5–10 equivalents of 1-hexene variously exhibited greater exotherms, quicker initial ethylene uptakes, and/or larger ultimate ethylene uptakes than control experiments. Addition of more than one equivalent of the modifiers, except 1-hexene, caused polymerization effectiveness to decrease compared to control runs.

The invention having been thus described, it will be obvious that the same may be varied in many ways without departing from the spirit and scope of the invention as defined by the following claims.

What is claimed is:

1. A transition metal-free catalyst system for synthesizing high molecular weight, linear polymers of olefins, comprising a catalyst composition having:
   (a) a neutral compound having the formula $AlR_3$, wherein Al is aluminum and R is an alkyl or hydride group;
   (b) a Lewis acid or Lewis acid derivative cocatalyst, different from the neutral compound, the cocatalyst reacting with the neutral compound to form an initiator; and
   (c) an activity-enhancing modifier comprising at least one of an internal olefin, a cyclic olefin or a terminal olefin the modifier reacting with the initiator to form the catalyst composition.

2. The system of claim 1 wherein R is ethyl.

3. The system of claim 1 wherein the cocatalyst is selected from the group consisting of borane and borate salt.

4. The system of claim 1 wherein the cocatalyst is selected from the group consisting of $B(C_6F_5)_3$, $[Ph_3C]^+[B(C_6F_5)_4]^-$ and $[Me_2PhNH]^+[B(C_6F_5)_4]^-$.

5. The system of claim 1 wherein the internal olefin comprises at least one of cis-stilbene, trans-stilbene, cis-2-hexene, trans-2-hexene, cis-3-and trans-3-hexene.

6. The system of claim 1 wherein the cyclic olefin comprises at least one of cyclopentene, cyclohexene and norbornene.

7. The system of claim 1 wherein the terminal olefin comprises at least one of styrene and hexene.

8. The system of claim 1 wherein the molar equivalent of the modifier to the molar equivalent of the aluminum in the neutral compound comprises a ratio of from 0.01–250 to 1, respectively.

9. The system of claim 8 wherein the ratio comprises from 0.2–20 to 1, respectively.

10. The system of claim 9 wherein the ratio comprises from 0.33–10 to 1, respectively.

11. The system of claim 1 wherein the catalyst composition comprises a supported catalyst composition.

12. The system of claim 11 wherein the supported catalyst composition comprises a silica supported catalyst composition.

13. A method for polymerizing at least one olefinic monomer, the method comprising the step of contacting a feed comprising the olefinic monomer under polymerization conditions with a transition metal-free catalyst composition having:
   (a) a neutral compound having the formula $AlR_3$, wherein Al is aluminum and R is an alkyl or hydride group;
   (b) a Lewis acid or Lewis acid derivative cocatalyst different from the neutral compound, the cocatalyst reacting with the neutral compound to form an initiator; and
   (c) an activity-enhancing modifier comprising at least one of an internal olefin, a cyclic olefin or a terminal olefin the modifier reacting with the initiator to form the catalyst composition.

14. The method of claim 13 wherein R is ethyl.

15. The method of claim 13 wherein the cocatalyst is selected from the group consisting of borane and borate salt.

16. The method of claim 13 wherein the cocatalyst is selected from the group consisting of $B(C_6F_5)_3$, $[Ph_3C]^+[B(C_6F_5)_4]^-$ and $[Me_2PhNH]^+[B(C_6F_5)_4]^-$.

17. The method of claim 13 wherein the internal olefin comprises at least one of cis-stilbene, trans-stilbene, cis-2-hexene, trans-2-hexene, cis-3-hexene and trans-3-hexene.

18. The method of claim 13 wherein the cyclic olefin comprises at least one of cyclopentene, cyclohexene and norbornene.

19. The method of claim 13 wherein the terminal olefin comprises at least one of styrene and 1-hexene.

20. The method of claim 13 wherein the molar equivalent of the modifier to the molar equivalent of the aluminum in the neutral compound comprises a ratio of from 0.01–250 to 1, respectively.

21. The method of claim 20 wherein the ratio comprises from 0.2–20 to 1, respectively.

22. The method of claim 21 wherein the ratio comprises from ±0.33–10 to 1, respectively.

23. The method of claim 13 wherein the catalyst composition comprises a supported catalyst composition.

24. The method of claim 23 wherein the supported catalyst composition comprises a silica supported catalyst composition.

25. The method of claim 13 wherein the olefinic monomer comprises ethylene.

26. The method of claim 13 wherein the olefinic monomer comprises propylene.

27. The method of claim 13 wherein the olefinic monomer comprises a mixture of ethylene and propylene.

28. The method of claim 13 wherein the contacting is at a temperature in the range of from about 0° C. to 100° C. and at pressures of from about 400 psig to 1,000 psig.

29. The method of claim 13 wherein the contacting is conducted in a solvent.

30. The method of claim 29 wherein the solvent comprises a polar solvent.

31. The method of claim 30 wherein the polar solvent comprises chlorobenzene.

32. The method of claim 13 wherein the contacting is conducted in a gas phase.

* * * * *

UNITED STATES PATENT AND TRADEMARK OFFICE
CERTIFICATE OF CORRECTION

PATENT NO. : 6,689,852 B2
DATED : February 10, 2004
INVENTOR(S) : Lisa S. Baugh et al.

It is certified that error appears in the above-identified patent and that said Letters Patent is hereby corrected as shown below:

Column 15,
Line 16, the range "±0.33 - 10" should read -- 0.33 - 10 --.

Signed and Sealed this

Twenty-seventh Day of April, 2004

JON W. DUDAS
*Acting Director of the United States Patent and Trademark Office*